Sept. 20, 1960      A. PAUQUET      2,953,121
HYDRAULICALLY CONTROLLED DRIVING
ARRANGEMENT FOR MOVABLE MEMBERS
Filed July 21, 1958

INVENTOR
ANDRÉ PAUQUET
By Irwin S. Thompson
ATTY.

United States Patent Office 2,953,121
Patented Sept. 20, 1960

2,953,121

HYDRAULICALLY CONTROLLED DRIVING ARRANGEMENT FOR MOVABLE MEMBERS

André Pauquet, Neuilly-sur-Seine, France, assignor to S.A. Emboutissage et Usinage de Saint-Denis, Saint-Denis, France, a corporation of France Filed July 21, 1958, Ser. No. 749,715

Claims priority, application France July 30, 1957

6 Claims. (Cl. 121—45)

The present invention has for its object improvements in hydraulically controlled arrangements for driving movable members.

It is a well-known fact that in many cases, the shifting of one or more movable members should be executed in a highly accurate manner. Thus, for instance, in the field of machine tools and particularly of those operating in accordance with an automatically controlled cycle, the movable members such as the carriages, the turret, the working table and the like should be stopped and their direction of speed should be changed at accurately defined points.

It is a well-known fact that the control of these different operations may be obtained through the use of mechanical stops engaged by the movable member driven by one or more hydraulic jacks, the pressure thus exerted on the stops being ensured by the pressure of the driving fluid, said stops being associated with electric arrangements incorporating a contact-piece, the opening and the closing of which are produced by the shifting of the movable driven member, said contact-piece or switch being inserted in circuits feeding electromagnetically controlled valves governing the distribution or the speed of flow of the hydraulic fluid.

One of the objects of the invention consists in providing a control system of a simple and sturdy structure requiring no frequent adjustment and the operation of which ensures a high accuracy for the movements of the driven member.

According to one of the features of the invention, the electric contact-pieces referred to hereinabove are housed inside a closed casing provided with only those ports which are required for the passage of the parts controlling the contact-pieces, the positions of said controlling parts being defined by the position of the driven member, and said parts being constituted preferably by bars or studs sliding through said ports.

This arrangement protects thus all the electrical contact-pieces against the action of shocks and against the dust, shavings or the like which might detrimentally affect their proper operation.

According to a further object of the invention, means are provided for reversing the direction of movement of the driven member or for stopping same, including studs controlling the corresponding electrical contact-pieces, said studs being shifted along their axes through the wall of said casing. One of these studs is shifted through the agency of a mechanical transmission constituted by an auxiliary rod carrying two stops of which one is housed inside the hollow rod of the hydraulic jack and is associated with a head rigid with the auxiliary rod which head is normally urged away from the outer transverse wall of the hydraulic cylinder by a spring to a predetermined extent. When the first-mentioned stop operates, it moves with the auxiliary rod carrying it until the head engages the outer wall of the cylinder against the action of the spring; at this moment, the stud or the like member actuating the corresponding contact-pieces has moved and acts on the latter so as to reverse the direction of operation of the hydraulic jack.

Furthermore, there is provided according to the invention, an arrangement for changing the speed of the driven member through the agency of a further rod rigid with the movable member of the jack and sliding in parallelism with the axis of the latter, said rod carrying at least one expansion or head acting on contact-pieces which allow inserting throttling means in the oil-returning circuits.

The features and advantages of the invention will be better understood through a reading of the following description given by way of example, reference being made to the accompanying drawings wherein.

Figures 1, 2:
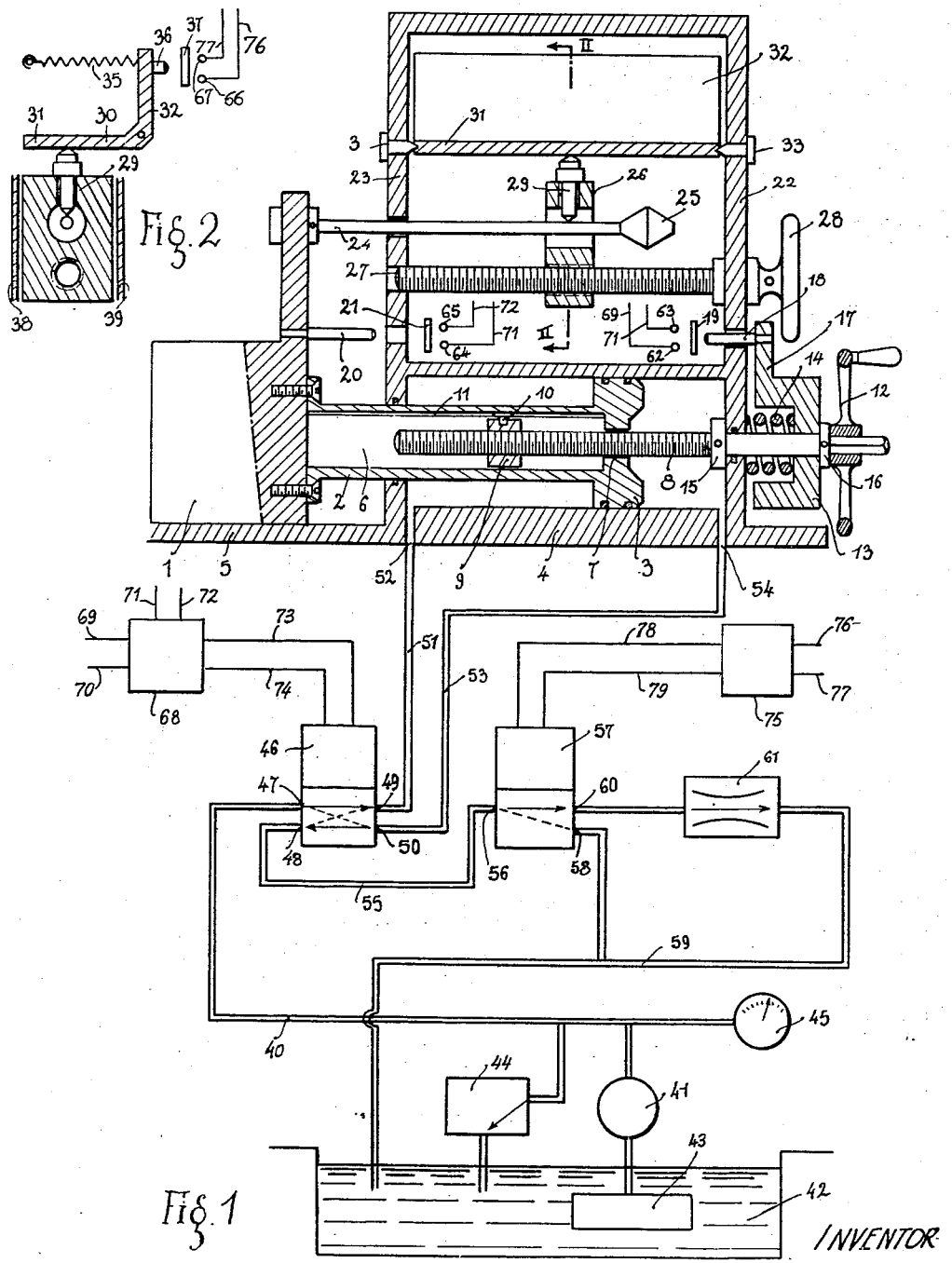
Fig. 1 is a cross-section of the mechanical portion of the arrangement while it illustrates diagrammatically the associated hydraulic control.
Fig. 2 is a partial cross-section through line II—II of Fig. 1.

Turning to Fig. 1, the movable member 1 rigid with the rod 2 of a piston 3 sliding inside a cylinder bore may move without any substantial friction over the table 5. The piston rod 2 is provided with an axial bore 6 followed by a narrower bore 7 extending inside the piston 3. A threaded inner auxiliary rod 8 passes freely along the axis of the bore 7 and is screwed into a nut 9 carrying a key 10 engaging a longitudinal groove 11 formed in the bore 6 of the piston rod. The threaded rod 8 controlled by the crank 12 may slide through the front wall of the cylinder 4 and its outer end outside the said cylinder carries a head 13 provided with a central recess inside which is compressed a spring 14. Two washers 15 and 16 keyed to the threaded rod 8 define a slight axial shifting for said threaded rod 8.

The head 13 includes an extension 17 to which is secured a stud 18 registering with a contact closing bridge 19. On the other hand, a stud 20 is rigid with the movable member 1 and registers with the contact-closing bridge 21. The two contact-closing bridges 19 and 21 are located between the two walls 22 and 23 of a closed casing and the studs 18 and 20 are adapted to pass through ports formed in said walls 22 and 23.

A rod 24 rigid with the movable member 1 carries at its end an olive-shaped head 25 and may slide with the latter inside a recess formed in a tapped slider 26 screwed over a threaded rod 27; the latter is carried between the walls 22 and 23 and is adapted to be angularly shifted by the knob 28. A push member 29 may slide transversely inside said slider 26 in a direction perpendicular to the rod 24 so as to engage the latter. A rocking member 30 including two flanges 31 and 32 is pivotally secured round two aligned pivots 33 and 34 secured to the casing walls 22 and 23. A spring 35 (Fig. 2) urges the upstanding flange 31 of the member 30 against the push member 29. The flange 32 carries a stud 36 registering with a further contact-closing bridge 37 carried inside the casing. The tapped slider 26 is guided during its movement between the lateral partitions 38 and 39 extending to either side thereof.

As shown diagrammatically in the illustration of the hydraulic control system, a pipe 40 is fed with oil under pressure by a pump 41 fed in its turn out of an oil container 42 through a filter 43. A flow adjusting valve 44 fitted in a by-pass allows maintaining at a predetermined value the pressure inside the pipe 40, which pressure may be controlled by a pressure gauge 45.

An electrically controlled valve 46 is provided with four ports 47, 48, 49 and 50 and of these the port 47 is connected with the pipe 40, the port 49 is connected through a pipe 51 with the port 52 in the hydraulic cylinder 4 facing the hollow piston rod 2, the port 50 is connected through a pipe 53 with the port 54 in the hydraulic cylinder 4 in the section on the outside of the piston 3 and lastly the port 48 is connected through a pipe 55 with the port 56 of a further electrically controlled valve 57; in the latter, the port 58 is connected with a return pipe 59 while its port 60 is connected with the input of a flow reducing or throttling device 61 the output end of which is connected with said return pipe 59.

When the electrically controlled valve 46 is no longer energized, the ports 47 and 49 on the one hand and 48 and 50 on the other hand, communicate with each other, as shown in solid lines. When, in contradistinction, the electrically controlled valve 46 is energized, the ports 47 and 50, on the one hand, and 48 and 49, on the other hand, are interconnected as shown in dot and dash lines.

When the electrically controlled valve 57 is not energized, the ports 56 and 60 communicate as shown in solid lines and when said valve 57 is energized, the ports 56 and 58 communicate as shown in dot and dash lines.

The circuit energizing the electrically controlled valve 46 includes the contact-pieces 62 and 63 associated with the contact-forming bridge 19 and the contact-pieces 64 and 65 associated with the contact-making bridge 61. Said circuit includes a number of relays and further means which do not form part of the invention and which have been schematically shown by a box 68 to which are connected the electrical wires 69 and 70 leading to the contacts 62, 63, the electrical wires 71 and 72 leading to the contacts 64, 65 and the electrical wires 73, 74 leading to the valve 46. It is sufficient to state that an even transient closing through the bridge of either of the pairs of contact-pieces 62, 63 and 64, 65 has for its result to produce a pulse energizing the electrically controlled valve 46 if it is deenergized and reversely. In other words, the condition of the valve is reversed.

Similarly, the energizing circuit of the electrically controlled valve 57 includes the contact-pieces 66 and 67 associated with their bridge 37. Said circuit comprises suitable relays which have been schematically shown by a box 75 to which are connected the electrical wires 76, 77 leading to the contacts 66, 67 and the electrical wires 78, 79 leading to the valve 57. The closing of the circuit over the contacts 66, 67 by the bridge 37 has for its result to produce a pulse setting the electrically controlled valve 57 in its energized position, if it is deenergized, and reversely.

The operation of said arrangement is as follows:

In the position illustrated in Fig. 1 for which neither of the electrically controlled valves 46 and 57 is energized so that the connections shown in solid line are established in said valves, the oil fed under pressure through the pipe 40 enters the port 47 and passes out of the valve 46 through the port 49 into the channel 51 and enters at 52 the left hand side of the hydraulic cylinder 4. Consequently, the oil contained in the right hand side of said cylinder is urged outwardly through the port 54 into the pipe 53 so that it passes through the ports 50 and 48 in the valve 46 and through the pipe 55 and the ports 56 and 60 in the valve 57 and that it finally reaches through the throttling means 61 the return pipe 59 and the container 42. Thus, the piston 3 moves towards the right hand side of Fig. 1 together with the movable member 1, the flow of oil being reduced by the throttling means 61 so that the progression of the member 1 is slow.

When the piston 3 abuts against the right hand wall of the cylinder 4, the stud 20 rigid with the member 1 engages the bridge 21 which urges the corresponding circuit against the contact-pieces 64 and 65 and consequently the previously deenergized electrically controlled valve 46 is energized.

The oil under pressure passing out of the pipe 40 enters now the interconnected ports 47 and 50 of the valve 46 and flows through the pipe 53 into the right hand port 54 in the cylinder 4.

The oil in the left hand side of the cylinder is thus urged out of the port 52 in the cylinder 4 and flows back through the pipe 51 and the interconnected ports 49 and 48 of the valve 46 into the pipe 55 and thence through the interconnected ports 56 and 60 of the valve 67 into the throttling means 51 and back through the return pipe 59 into the container 42. The piston 3 moves thus towards the left hand side and carries along with it the movable member 1. Since the flow of oil is damped as precedingly by the throttling means 61, the return movement is slow and is executed at the same speed as the prior progression.

When the olive-shaped head 25 carried along by the member 1 through the rod 24 is shifted into the slider 26, the push member 29 is urged outwardly and bears against the normally horizontal flange 31 of the rocking member 30 whereby the bridge 37 is urged by the stud 36 into operative engagement with the corresponding contact-pieces 66 and 67. Thus, the electrically controlled valve 57 is energized and the oil is caused to flow between the interconnected ports 56 and 58 so that the oil returns directly into the return pipe 59. Therefore the movement is no longer damped and the piston 3 continues moving towards the left but at a higher speed depending on the pressure prevailing in the pipe 40.

When the piston 3 abuts against the nut 9 at the end of its movement towards the left, it first carries along with it said nut together with the threaded rod 8 and its head 13. The latter compresses the spring 14 until said head abuts against the outer surface of the casing. At this moment, the shifting of the head 13 is such that the stud 18 carried thereby pushes the contact-closing bridge 19, so as to electrically interconnect the contact-pieces 62—63. This sets the electrically controlled valve 46 in its deenergized condition. The movement of the piston towards the right hand side is resumed in the manner described precedingly with the sole difference that, the valve 57 being energized, the movement of the piston will be performed at a raised speed equal to the higher return speed until the olive-shaped head 25 is again shifted out of the slider 26 so as to return the valve 57 into its deenergized condition through release of the bridge 37 to slow down the speed. The cycle of operations is then repeated in the manner described.

It is apparent that all the operations such as the stopping, the reversal of the direction of progression and the change of speed are obtained by the closing and opening of electric contact-pieces protected by the casing, the control means for said contact-pieces being constituted by elongated members sliding through the walls of the casing and the movements of which are governed by the movements of the movable member.

Whatever may be the length of stroke of the piston, the adjustment of the contact-pieces is executed once and for all and does not vary; as a matter of fact, it is never necessary to adjust said contact-pieces during operation since the length of stroke of the piston and the speed of progression are adjustable in the manner described through rotation of the threaded rods 8 and 27 respectively.

The arrangement disclosed has been illustrated solely by way of example and numerous modifications may be brought thereto without unduly widening the scope of the invention as defined in the accompanying claims. Thus, it is possible through a suitable electrical arrangement to obtain the modification of the lead in either direction or in both directions or to reverse the succession of the slow and rapid leads in accordance with any desired combination. Similarly, although it has been assumed in the example described that the cylinder is stationary and the piston movable, yet it is self-evident that the piston may be stationary and the cylinder movable. The hydro-electric system may be constituted no longer by a single hydraulic jack but by a plurality of jacks, the successive movements of which are adapted to release and to control one another.

What I claim is:

1. A hydraulically controlled driving arrangement for a reciprocatory movable member, chiefly a part of a machine-tool, comprising at least one hydraulic jack including a cylinder, a longitudinally bored rod provided with an inwardly facing shoulder in said bore, a piston rigid with said rod and slidingly engaging the cylinder to execute a reciprocatory stroke defined between an outer unvarying end and an inner end, means whereby the movable member moves in unison with the piston of the hydraulic jack, an elongated member slidingly extending inside the bore in the piston rod longitudinally thereof and through the piston and cylinder beyond the forward end of the latter, a spring urging said elongated member outwardly, means limiting the outward movement of the elongated member with reference to the jack cylinder, a stop carried by the elongated member adapted to abut against the shoulder in the bore in the piston rod during the inward stroke of the piston and to be urged inwardly by said shoulder against compression of said spring into its predetermined inner position defining the inner end of the jack piston stroke, valves controlling the direction and the speed of passage of the fluid through the jack and thereby the direction and speed of said jack section and movable member, an electric circuitry controlling the operative condition of the valves, switches in said circuitry adapted to change the condition of the cooperating valves between two operative conditions corresponding for at least one valve to different directions of said passage of fluid and for at least one other valve to different speeds of said passage, a closed casing provided with a number of ports and enclosing said switches, means controlled by the movable member and said jack piston, extending through the corresponding ports to engage the cooperating switches at predetermined moments and thereby produce the change of the operative condition of the associated valves and the reversal of the movement of the jack piston at the end of its outward stroke and the change of speed of the liquid in the jack at a predetermined point of its stroke in either direction, further means controlled by the outer end of the elongated member and extending through a corresponding port in the casing to engage the corresponding switch at a predetermined moment and thereby produce the change of the operative condition of the associated valve and reversal of movement of the jack piston at the end of its inward stroke.

2. A hydraulically controlled driving arrangement for a reciprocatory movable member, chiefly a part of a machine-tool, comprising at least one hydraulic jack including a cylinder, a longitudinally bored rod provided with an inwardly facing shoulder in said bore, a piston rigid with said rod and slidingly engaging the cylinder to execute a reciprocatory stroke defined between an outer unvarying end and an inner end, means whereby the movable member moves in unison with the piston of the hydraulic jack, a threaded rod slidingly and coaxially engaging said bore in the hydraulic piston rod and extending forwardly through the piston and the front wall of the cylinder, a nut forming a stop threadedly engaging said threaded rod inside the piston rod bore, means preventing rotation of said nut inside said bore, a spring urging said threaded rod outwardly, means limiting the outward movement of the threaded rod with reference to the jack cylinder, the engagement of the nut by the shoulder in the bore of the piston rod during the inward movement of the piston urging the nut and threaded rod inwardly against compression of said spring into its predetermined inner position defining the inner end of the jack piston stroke, a crank carried by the threaded rod on the outside of the jack cylinder and adapted when rotated to adjust the longitudinal position of said nut on the threaded rod, valves controlling the direction and the speed of passage of the fluid through the jack, an electric circuitry controlling the operative condition of the valves, switches in said circuitry adapted to change the condition of the cooperating valves between two operative conditions corresponding for at least one valve to different directions of said passage of fluid and for at least one other valve to different speeds of said passage, a closed casing provided with a number of ports and enclosing said switches, means controlled by the movable member, extending through the corresponding ports to engage the cooperating switches and thereby produce reversal of the movement of the jack piston at the end of its outward stroke and the change of speed of the liquid in the jack at a predetermined point of its stroke in either direction, further means controlled by the outer end of the threaded rod and extending through a corresponding port in the casing to engage the corresponding switch at a predetermined moment and thereby produce the reversal of movement of the jack piston at the end of its inward stroke.

3. A hydraulically controlled driving arrangement for a reciprocatory movable member, chiefly a part of a machine-tool, comprising at least one hydraulic jack including a section mechanically connected with the movable member, valves controlling the direction and the speed of passage of fluid through the jack and thereby the direction and speed of said jack section and movable member, an electric circuitry controlling the operative condition of the said valves, switches in said circuitry adapted to change the condition of the cooperating valves between two operative conditions corresponding for at least one valve to different directions of said passage of fluid and for at least one other valve to different speeds of said passage, a closed casing provided with a number of ports and enclosing said switches, means controlled by the movable member and said jack section, extending through the corresponding ports to engage the cooperating switches at predetermined moments and thereby produce the change of the operative condition of the associated valves defining the direction of passage of the fluid, a rod moving in unison with the movable member and slidingly engaging a port in the casing, a head provided at the end of said rod inside the casing, a carrier adapted to be longitudinally shifted across the inside of the casing, a projection slidably mounted in said carrier to be urged outwardly in a direction radial of the headed rod by the head of the headed rod when registering transversely with said projection, a member adapted to rock inside the casing round an axis parallel with the headed rod to control one of the switches and thereby change the condition of the corresponding valve defining the speed of feed of the fluid through the hydraulic jack.

4. A hydraulically controlled driving arrangement for a reciprocatory movable member, chiefly a part of a machine-tool, comprising at least one hydraulic jack including a section mechanically connected with the movable member, two valves adapted to be shifted between two operative conditions defining respectively two directions of movement and two speeds of the fluid feeding the hydraulic cylinder, a circuit controlling each valve, two switches in the first circuit adapted each when shifted in either direction to modify the condition of said valve between its two operative conditions, a switch in the circuit controlling the second valve and the operation of which changes the condition of the valve between its two operative positions, a closed casing enclosing said switches and provided with ports in its wall, two studs moving in unison with the movable member and extending through the ports in the casing and adapted to control respectively one of the two first switches for predetermined terminal positions of the movable member, a rod moving in unison with said movable element and extending through a corresponding port in the casing, a carrier adapted to be adjustably shifted across the casing along a line parallel with the rod, a projection mounted in said carrier and adapted to slide longitudinally of the rod, a head on the rod engaging said projection for a predetermined position of the movable member and rod to urge said projection outwardly and a member adapted to rock inside the casing round an axis parallel with the axis of the rod and to be shifted by the outward movement of the projection into a rocked operative position for which it closes the switch to the second valve to obtain a predetermined change in speed of the fluid.

5. A hydraulically controlled driving arrangement for a reciprocatory movable member, chiefly a part of a machine-tool, comprising at least one hydraulic jack including a cylinder, a longitudinally bored rod provided with an inwardly facing shoulder in said bore, a piston rigid with said rod and slidingly engaging the cylinder to execute a reciprocatory stroke defined between an outer unvarying end and an inner end, means whereby the movable member moves in unison with the piston of the hydraulic jack, an elongated member slidingly extending inside the bore in the piston rod longitudinally thereof and through the piston and cylinder beyond the forward end of the latter, a spring urging said elongated member outwardly, means limiting the outward movement of the elongated member with reference to the jack cylinder, a stop carried by the elongated member adapted to abut against the shoulder in the bore in the piston rod during the inward stroke of the piston and to be urged inwardly by said shoulder against compression of said spring into its predetermined inner position defining the inner end of the jack piston stroke, two valves adapted to be shifted between two operative conditions defining respectively two directions of movement and two speeds of the fluid feeding the hydraulic cylinder, a circuit controlling each valve, two switches in the first circuit adapted each when shifted in either direction to modify the condition of said valve between its two operative conditions, a switch in the circuit controlling the second valve and the operation of which changes the condition of the valve between its two operative positions, a closed casing enclosing said switches and provided with ports in its wall, two studs carried respectively by the outer end of the elongated member and by the movable member and extending through the ports in the casing and adapted to control respectively one of said two switches for predetermined terminal positions of the movable member, and means extending through a port and controlling the switch to said second valve.

6. A hydraulically controlled driving arrangement for a reciprocatory movable member, chiefly a part of a machine-tool, comprising a hydraulic jack including a cylinder, a longitudinally bored rod provided with an inwardly facing shoulder in said bore, a piston rigid with said rod and slidingly engaging the cylinder to execute a reciprocatory stroke defined between an outer unvarying end and an inner end, means whereby the movable member moves in unison with the piston of the hydraulic jack, an elongated member slidingly extending inside the bore in the piston rod longitudinally thereof and through the piston and cylinder beyond the forward end of the latter, a spring urging said elongated member outwardly, means limiting the outward movement of the elongated member with reference to the jack cylinder, a stop carried by the elongated member adapted to abut against the shoulder in the bore in the piston rod during the inward stroke of the piston and to be urged inwardly by said shoulder against compression of said spring into its predetermined inner position defining the inner end of the jack piston stroke, two valves adapted to be shifted between two operative conditions defining respectively two directions of movement and two speeds of the fluid feeding the hydraulic cylinder, a circuit controlling each valve, two switches in the first circuit adapted each when shifted in either direction to modify the condition of said valve between its two operative conditions, a switch in the circuit controlling the second valve and the operation of which changes the condition of the valve between its two operative positions, a closed casing enclosing said switches and provided with ports in its wall, two studs carried respectively by the outer end of the elongated member and by the movable member and extending through the ports in the casing and adapted to control respectively one of said two switches for predetermined terminal positions of the movable member, a further rod parallel with the piston rod moving in unison with said movable element and extending through a corresponding port in the casing, a carrier adapted to be adjustably shifted across the casing along a line parallel with the further rod, a projection mounted in said carrier and adapted to slide radially of the further rod, a head on the third rod engaging said projection for a predetermined position of the movable member and further rod to urge said projection outwardly and a member adapted to rock inside the casing round an axis parallel with the axis of the piston rod and to be shifted by the outward movement of the projection into a rocked operative position for which it closes the switch to said second valve to obtain a predetermined change in speed of the fluid.

References Cited in the file of this patent
UNITED STATES PATENTS

| 1,905,133 | Bishop | Apr. 25, 1933 |
| 2,351,263 | Harrington | June 13, 1944 |
| 2,736,296 | Romine | Feb. 28, 1956 |